G. R. Andrus,
Manf. Pliers.

No. 85,503. Patented Jan. 5. 1869.

Witnesses.
E. W. Bliss
Jeremy W. Bliss.

Inventor.
G R Andrus

United States Patent Office.

GEORGE R. ANDRUS, OF EAST BERLIN, CONNECTICUT.

Letters Patent No. 85,503, dated January 5, 1869.

IMPROVED DIE FOR FORMING PLIER-JOINTS.

The Schedule referred to in these Letters Patent and making part of the same.

*To all whom it may concern:*

Be it known that I, GEORGE R. ANDRUS, of East Berlin, county of Hartford, and State of Connecticut, have invented certain new and useful Improvements in Compressing Joints of Pliers; and to enable others skilled in the art to make and use the same, I will proceed to describe its construction and operation, by referring to the drawings, in which the same letters indicate like parts in each of the figures.

The nature of this invention consists in a pair of swage-dies, (an upper die and a lower die,) into the faces of which is worked or formed the finished shape of a pair of pliers.

In the accompanying drawings—

*a* is a depression formed in each half or part of the dies, the shape of which is made to correspond, or adapted to the finished shape required for the pliers.

*c* is a side and edge view, showing the shape or condition of one part of the pliers before they are put together.

*d* is a side and edge view, showing the shape or condition of the other part of the pliers before they are put together.

These two parts, *c d*, having been previously formed in dies specially prepared therefor, the part, *d*, is heated to a proper heat to work the metal, the other part, *c*, is inserted through the opening *e*, and the two parts, *c d*, are placed into or directly over the lower depression of the lower portion of the dies, and the upper die is forced down, by a drop or press, upon the lower die, thus compressing the two parts, *c d*, together, in an exact uniform position relative to each other, and at the same time producing a perfect joint and uniformity of shape, thus rendering the work heretofore irksome, and which required the practice of skilful workmen, simple, easy, and pleasant to perform by ordinary workmen, thus producing a superior quality, and greatly lessening the cost of manufacture.

I believe I have thus shown the nature and advantage of this invention, so as to enable others skilled in the art to make and use the same therefrom.

What I claim, therefore, and desire to secure by Letters Patent, is—

Figure 1:
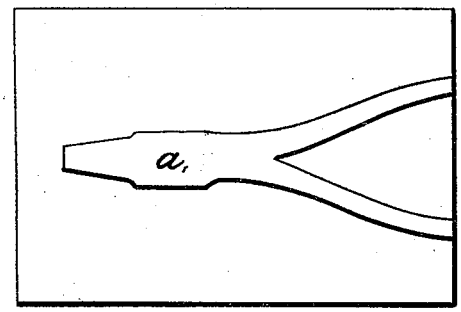
Figure 1 shows the face of the two dies, in which is formed the finished shape of the pliers.
Figure 1:
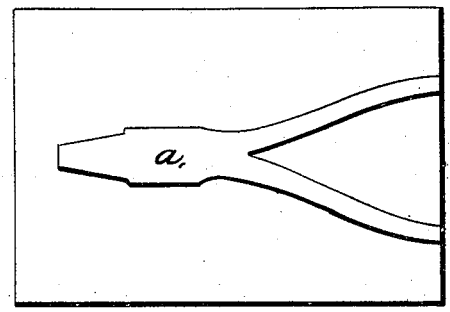
Figure 1:
Figure 3:
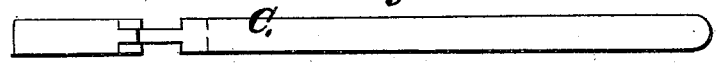
Figures 3 and 4 show a side and edge view of the two parts of the pliers before they are put together.
Figure 3:
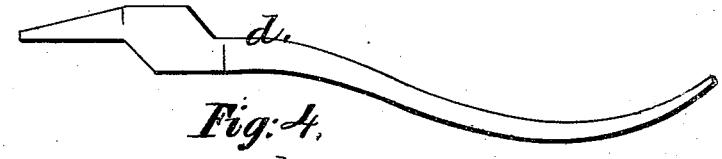
Figure 4:
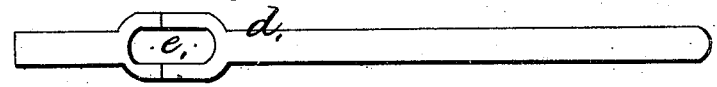
Figure 2:
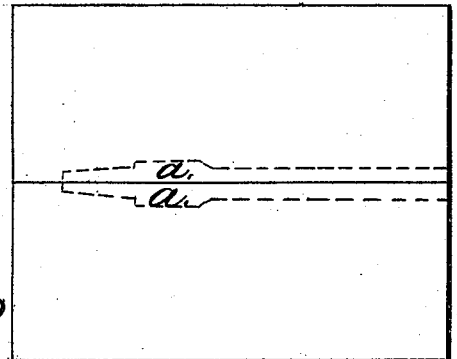
Figure 2 shows a section edge view of the two dies.

The dies, figs. 1 and 2, for uniting and compressing the metal to a joint in pliers, substantially as described.

G. R. ANDRUS. [L. S.]

Witnesses:
  E. W. BLISS,
  JEREMY W. BLISS.

*Assignor to the Roys & Wilcox Company.*